United States Patent [19]
Bae

[11] Patent Number: 6,138,280
[45] Date of Patent: Oct. 31, 2000

[54] SWEATBAND FOR HEADGEAR

[75] Inventor: Yong-Min Bae, Seoul, Rep. of Korea

[73] Assignee: Yupoong & Co., LTD, Seoul, Rep. of Korea

[21] Appl. No.: 09/415,703

[22] Filed: Oct. 11, 1999

[30]     Foreign Application Priority Data

Oct. 26, 1998 [KR]  Rep. of Korea .................. 9-20461

[51] Int. Cl.⁷ ........................................... A42B 5/00
[52] U.S. Cl. .............................. 2/181; 2/181.2; 2/DIG. 11
[58] Field of Search ...................... 2/181, 181.2, 181.6,
                        2/195.1, 209.12, 175.5, 425, DIG. 11

[56]              References Cited

U.S. PATENT DOCUMENTS

| | | | |
|---|---|---|---|
| 2,144,870 | 1/1939 | Bullard | 2/410 |
| 4,815,144 | 3/1989 | Martin | 2/7 |
| 5,033,122 | 7/1991 | Smith | 2/209.3 |
| 5,566,395 | 10/1996 | Nebeker | 2/181 |
| 5,915,534 | 6/1999 | May | 2/181.4 |
| 5,920,910 | 7/1999 | Calvo | 2/181.4 |

*Primary Examiner*—Bibhu Mohanty
*Attorney, Agent, or Firm*—Armstrong, Westerman, Hattori, McLeland & Naughton

[57]              ABSTRACT

A sweatband for headgear is disclosed. The sweatband has a plurality of laminated absorbent non-woven fabric strips. One or more first unabsorbent non-woven fabric strips are interposed between the laminated absorbent non-woven fabric strips. A second unabsorbent non-woven fabric strip is positioned at the back of the laminated absorbent non-woven fabric strips. The fabric strips are bonded together. A plurality of vertical slits are formed along the upper and lower edges of the bonded fabric strips at intervals. According to another embodiment, intervals of the slits may be 6 mm and lengths of the slits may be 5 mm.

2 Claims, 3 Drawing Sheets

SWEATBAND FOR HEADGEAR

BACKGROUND OF THE INVENTION

1. Field of the Invention

The present invention relates, in general, to sweatbands and, more particularly, to a sweatband for headgear, preventing the crown of a headgear from becoming wet with the sweat by interposing one or more unabsorbent non-woven fabric strips between laminated absorbent non-woven fabric strips and positioning an unabsorbent non-woven fabric strip at the back of the laminated absorbent non-woven fabric strips, and allowing a sweatband to be wrinkle-free by forming a plurality of vertical slits along the upper and lower edges of the sweatband at certain intervals, thereby allowing the cut and shrunken upper edge of the headgear to be partially overlapped.

2. Description of the Prior Art

As well known to those skilled in the art, a sweatband for headgear is a band lining the inside of a hat or cap to protect it against the sweat from the head.

As shown in FIG. 1, a conventional sweatband S' consists of inner absorbent laminated non-woven fabric strips and an outer unabsorbent waterproof film or sheet.

However, according to the conventional sweatband, the following disadvantages occur.

Since the outer unabsorbent element consists of only one layer, a degree of absorbed sweat in the sweatband soaks into the headgear when the inner absorbent element absorbs a large amount of sweat from the head. Additionally, since the inner absorbent element consists of multiple layers and the outer unabsorbent element consists of one layer, the headgear as well as the sweatband S' is wrinkled when the inner absorbent element is sewn together with the outer unabsorbent element. As a result, the appearance of a cap C becomes distorted.

SUMMARY OF THE INVENTION

Accordingly, the present invention has been made keeping in mind the above problems occurring in the prior art, and an object of the present invention is to provide a sweatband for headgear, preventing the crown of a headgear from becoming wet with the sweat by interposing one or more unabsorbent non-woven fabric strips between laminated absorbent non-woven fabric strips and positioning an unabsorbent non-woven fabric strip at the back of the laminated absorbent non-woven fabric strips, and allowing a sweatband to be wrinkle-free by forming a plurality of vertical slits along the upper and lower edges of the sweatband at certain intervals, thereby allowing the cut and shrunken upper edge of the headgear to be partially overlapped.

In order to accomplish the above object, the present invention provides a sweatband for headgear, comprising a plurality of laminated absorbent non-woven fabric strips, one or more first unabsorbent non-woven fabric strips interposed between the laminated absorbent non-woven fabric strips, and a second unabsorbent non-woven fabric strip positioned at the back of the laminated absorbent non-woven fabric strips, wherein the fabric strips are bonded together and a plurality of vertical slits are formed along the upper and lower edges of the bonded fabric strips at intervals.

According to another embodiment, intervals of the slits may be 6 mm and lengths of the slits may be 5 mm.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
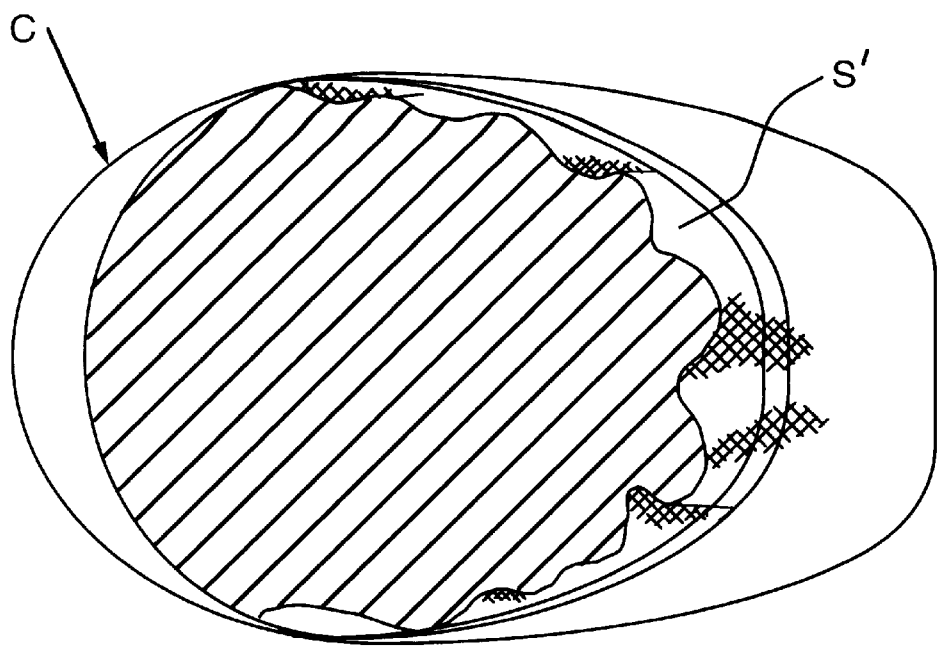
FIG. 1 is a bottom view, showing a cap provided with a conventional sweatband.
Figure 2:
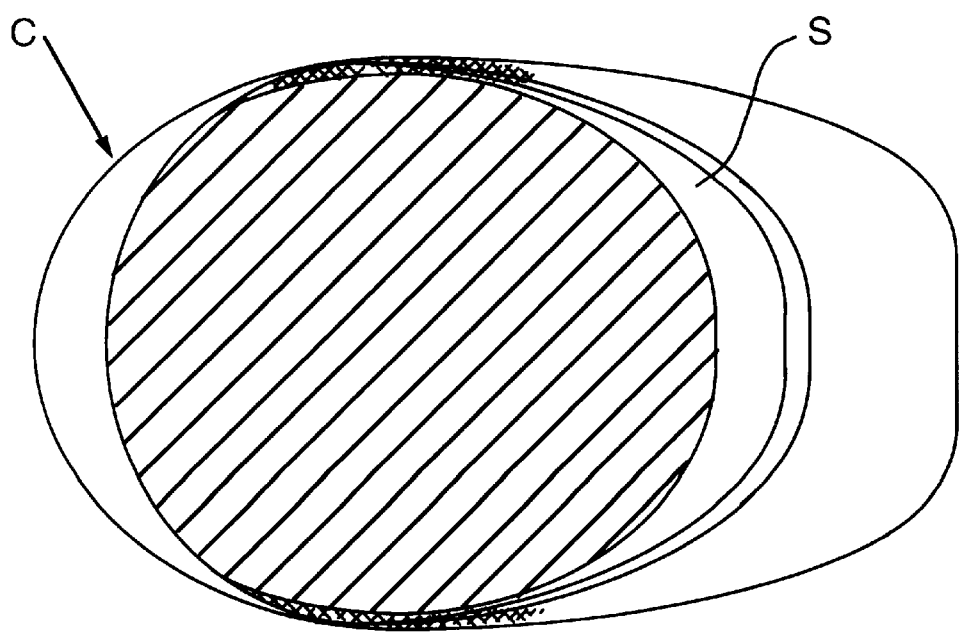
FIG. 2 is a bottom view, showing a cap provided with a sweatband according to the preferred embodiment of this invention.
Figure 3A:
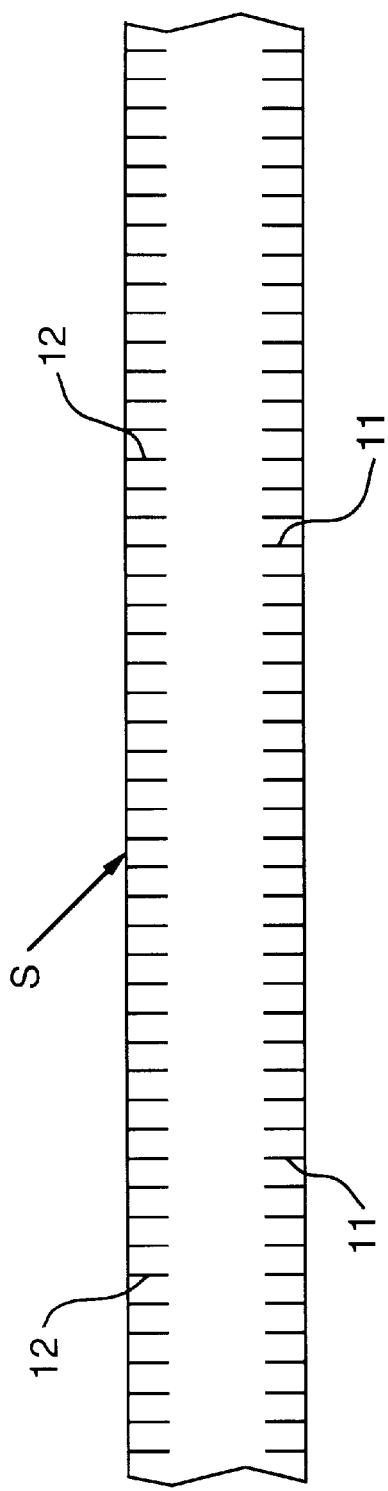
FIG. 3a is a plan view, showing the sweatband of the embodiment.
Figure 3B:
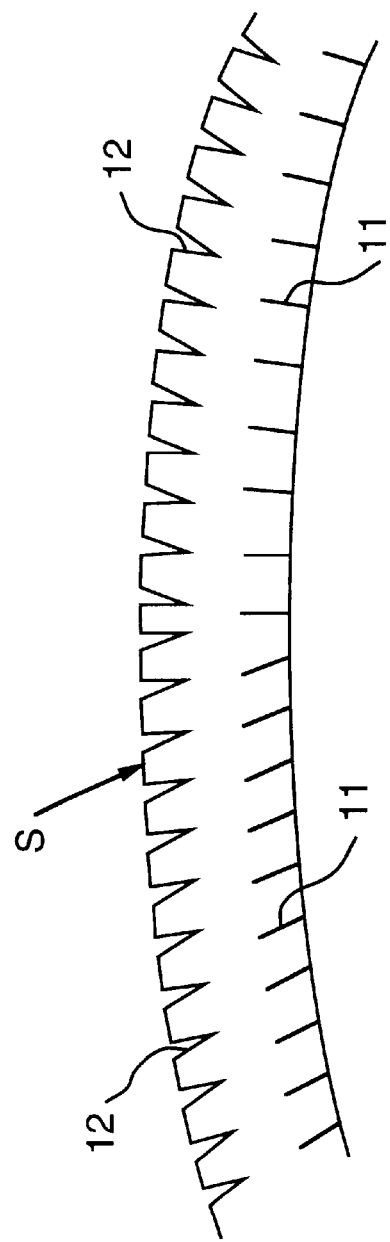
FIG. 3b is a plan view, showing the sweatband sewn to the cap according to the embodiment.
Figure 4:
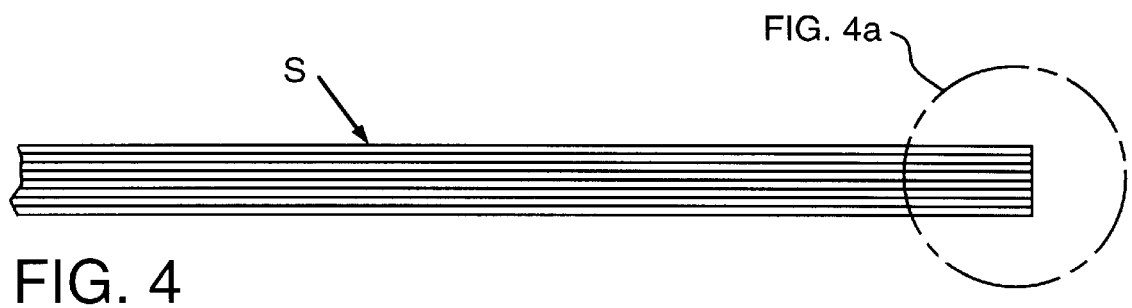
FIG. 4 is a side view, showing the sweatband of the embodiment, with the end of the sweatband being partially enlarged.
Figure 4A:
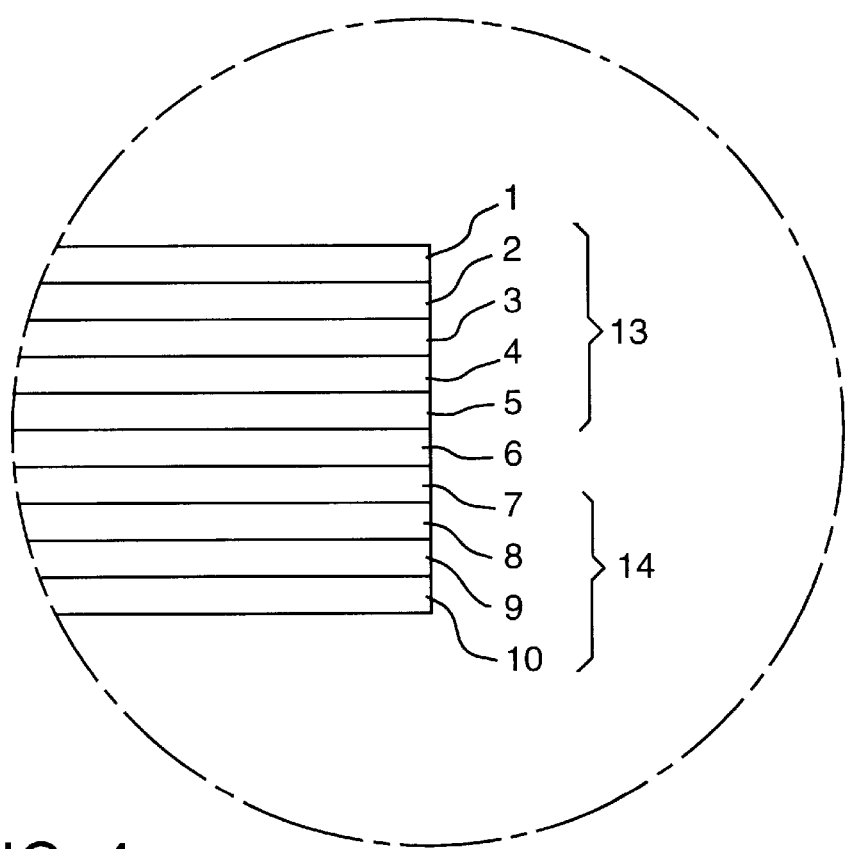

For ease of illustration, the caps and sweatbands in FIGS. 1–3b are illustrated upside down. However, the caps and sweatbands in the following description are referred to in a right-side up position.

A sweatband of this embodiment comprises a plurality of first laminated absorbent non-woven fabric strips 1, 2, 3, 4 and 5. A first unabsorbent non-woven fabric strip 6 is laminated on the absorbent non-woven fabric strip 5. A plurality of second laminated absorbent non-woven fabric strips 7, 8 and 9 are again laminated on the unabsorbent non-woven fabric strip 6. A second unabsorbent non-woven fabric strip 10 is again laminated on the absorbent non-woven fabric strip 9. The non-woven fabric strips 1–10 may be bonded together by a high frequency heat sealing technique. A plurality of vertical slits 11 and 12 are formed along the upper and lower edges of the sweatband at intervals of 6 mm. The slits 11 and 12 may be 5 mm long.

The intervals and lengths of the slits 11 and the number of the strips may be various according to the design of the headgear.

Such a sweatband S is sewn to the lower edge of the crown C of a cap at its lower edge. In such a case, since the sweatband S has to be sewn while being downwardly bent, the lower edge is extended and the upper edge is shrunken. Although wrinkles are formed on the sweatband S due to the deformation of the sweatband S, almost no wrinkles are formed on the sweatband S because the cut and shrunken upper edge is partially overlapped.

Additionally, since the first and second unabsorbent non-woven fabric strips 6 and 10 are respectively positioned at the back of the first and second laminated absorbent non-woven fabric strips 1–5 and 7–9, absorbed sweat in the sweatband may not soak into the crown C of the cap even though the first and second laminated absorbent non-woven fabric strips 1–5 and 7–9 absorb a large amount of sweat from the head.

In this embodiment, the term "absorbent non-woven fabric strip" refers to an unprocessed normal non-woven fabric strip, while the term "unabsorbent non-woven fabric strip" refers to a non-woven fabric strip coated with a hydrophobic synthetic resin.

From the above description, it will be understood that this invention provides a sweatband for headgear, preventing the crown of a headgear from becoming wet with the sweat by interposing one or more unabsorbent non-woven fabric strips between laminated absorbent non-woven fabric strips and positioning an unabsorbent non-woven fabric strip at the back of the laminated absorbent non-woven fabric strips.

This invention also provides a sweatband for headgear, allowing a sweatband to be wrinkle-free by forming a plurality of vertical slits along the upper and lower edges of the sweatband at certain intervals, thereby allowing the cut and shrunken upper edge of the headgear to be partially overlapped.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sweatband for headgear, comprising:

a plurality of laminated absorbent non-woven fabric strips;

one or more first unabsorbent non-woven fabric strips interposed between the laminated absorbent non-woven fabric strips; and a second unabsorbent non-woven fabric strip positioned at a back of the laminated absorbent non-woven fabric strips;

wherein the fabric strips are bonded together and a plurality of vertical slits are formed along the upper and lower edges of the bonded fabric strips at intervals.

2. The sweatband according to claim 1, wherein intervals of the slits are 6 mm and lengths of the slits are 5 mm.

* * * * *